Patented Jan. 10, 1950

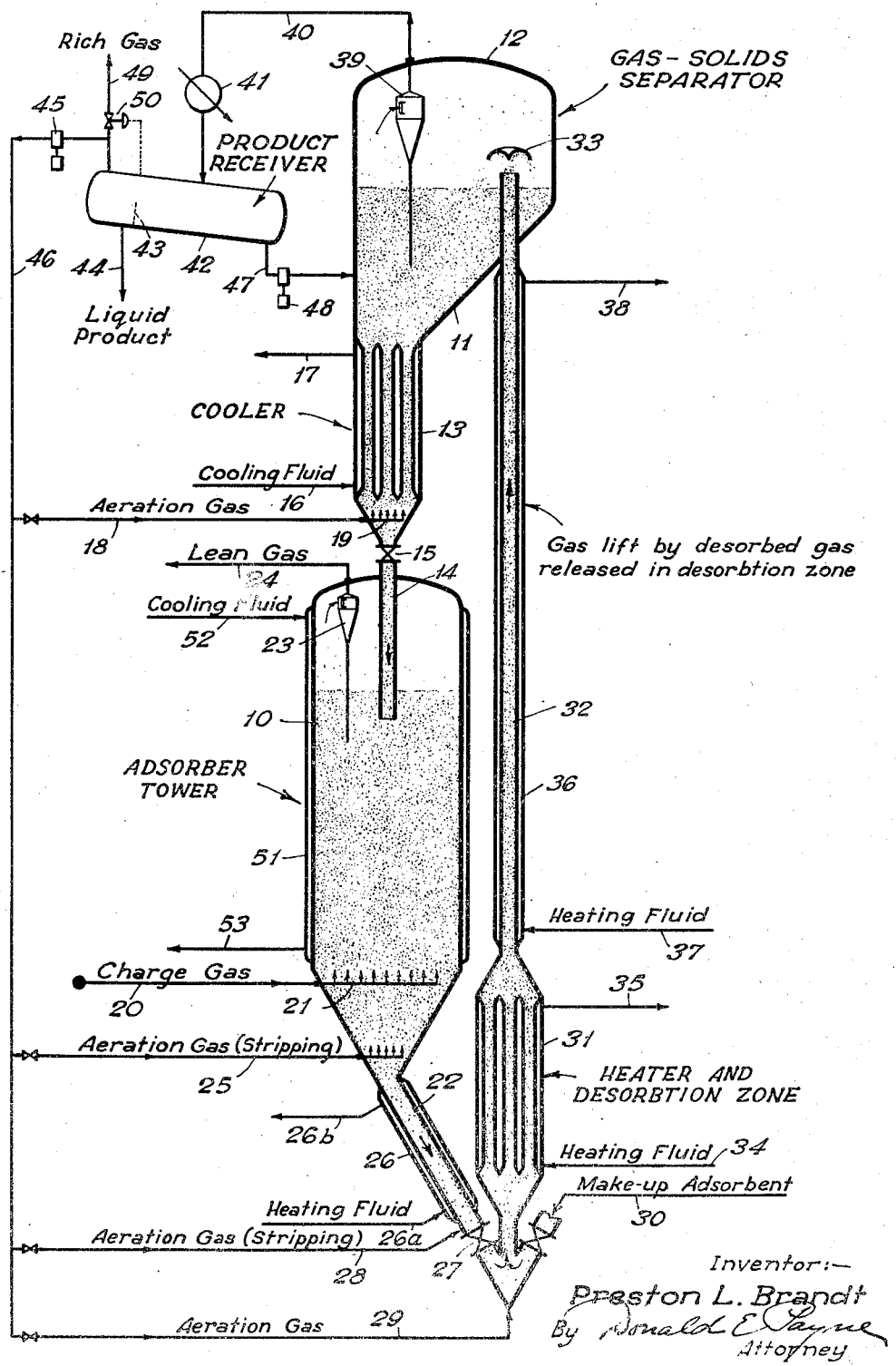

2,493,911

UNITED STATES PATENT OFFICE 2,493,911

SEPARATION BY ADSORPTION

Preston L. Brandt, Galveston, Tex., assignor to Pan American Refining Corporation, New York, N. Y., a corporation of Delaware Application November 30, 1944, Serial No. 565,931

9 Claims. (Cl. 183—114.2)

This invention relates to separation by adsorption and it pertains more particularly to a new and improved method and means for separating a normally liquid or normally gaseous component from a gas or vapor stream. More specifically, the invention relates to adsorption and recovery of a desired component or components of a mixture by means of finely divided solid adsorbents continuously circulating in a closed system.

The invention is applicable to the separation of hydrocarbons of different molecular weight, for example, the separation of condensible hydrocarbons such as butanes and propane from relatively fixed gases such as methane or to the recovery of gasoline from natural gas or other gasoline-containing gases. The invention is also applicable to the separation of hydrocarbons of similar molecular weight but different chemical constitution, e. g. the separation of butanes from butenes. It is applicable to the separation of normally liquid components which are miscible in each other and are not readily separable by ordinary distillation, e. g. separation of benzene from cyclohexane. It is applicable to the recovery of solvents from gas or vapor streams, the removal of moisture from air, to the recovery of helium from natural gases and to many other adsorption processes too numerous to mention.

An object of my invention is to provide a more efficient method and means for effecting separation by adsorption than has ever heretofore been known, a method which will require a minimum capital investment and which can be operated at minimum expense. A further object is to provide a method and means for circulating adsorption material without contaminating said material with extraneous carrier gases and without the use of mechanical impellers, screw pumps or conveyors. Mechanical impellers are expensive to install and operate, are quickly eroded by the solids in the system and furthermore they cause disintegration and impaired adsorptive properties in the adsorbent material itself. While pneumatic conveyor systems alleviate erosion to a considerable extent they present a further problem of contaminating the adsorbent material or the desired product. My object is to avoid not only mechanical impellers but also to avoid the use of extraneous carrier gases which might contaminate the product, impair the efficiency of the adsorbent, render product and separation recovery more difficult, etc.

A specific object of the invention is to effect transfer of adsorbent material from a low level to a high level by the gas lift effect of liberated product gases or vapors themselves so that it is unnecessary to provide even a gas compressor for supplying carrier gas.

Another object is to provide a method and means for increasing the selectivity of an adsorption process. Other objects will become apparent as the detailed description of the invention proceeds.

In practicing my invention I employ a solid adsorbent of finely divided particle size. A preferred particle size is within the approximate range of .001 to .01 inch although particle sizes as large as .1 or even .2 inch may be employed when the material is sufficiently porous and of such density and surface characteristics as to enable its fluidization and transfer in the manner hereinafter described. Generally speaking, a preferred particle size is within the approximate range of .001 to .01 inch. The adsorbent material itself may be any such material known to the art such for example as adsorbent charcoal, activated alumina, silica gel, etc. A hard, tough, porous, gel-type structure is desirable for minimizing attrition. Since adsorbent materials for the various processes enumerated are well known in the art, it is unnecessary to describe their composition or method of preparation in any further detail.

The adsorption itself may be effected by passing a gas or vapor mixture upwardly through an adsorption tower in a direction generally countercurrent to downwardly moving adsorbent material. The vertical velocity of the gases or vapors through the tower may be so low as to avoid any appreciable turbulence of adsorbent material so that the adsorbent material passes downwardly through the tower somewhat like a moving bed. I prefer to employ a vertical gas or vapor velocity of the order of about .2 to 2 feet per second when employing adsorbent material of relatively small particle size or of the order of about .5 to 5 feet per second when employing relatively large particle sizes. In either case the upflowing gas or vapor should "fluidize" the solids to such an extent that the mass of solids will develop a pseudo hydrostatic head at its base and thus insure the necessary pressure differential for transfer of the solids to the desorption zone. The adsorbent material should be relatively cool when it enters the top of the adsorption tower and it may be further cooled as it passes downwardly in the tower. It passes from the base of the tower as a downwardly moving fluidized column of relatively high density and sufficient aeration gas may be introduced into said column (or generated by heat) to maintain the solids in fluent form.

At a low level the saturated adsorbent material passes into a heater of restricted cross-sectional area which raises the temperature of said material to such an extent as to effect desorption and the liberation of large volumes of gas or vapor. This liberated gas or vapor flows upwardly at high velocity, due to the restricted cross-sectional area and it thereby suspends the denuded solids and carries them upwardly to a gas or vapor-solids separation zone. Thus by the simple application of heat I effect transfer of solids from the low level of the heating zone to a separation zone which is at a substantially higher level than the adsorption zone. The kinetic energy of the rapidly flowing gas stream is supplied by the heat in the desorption zone, and this kinetic energy carries the solids to a high level, thereby providing potential energy for effecting the transfer of the solids back through the system. The solids are thus transferred without the use of any mechanical impeller and without the necessity of introducing any extraneous carrier gas. The substantially vertical line leading upwardly to the gas-solid separation zone may be heated only at its base or may be heated throughout substantially its entire length, the desorption being effected simultaneously with solids transfer and furnishing the motive power for solids transfer.

The solids are separated from liberated gases or vapors in the separation zone chiefly by gravity settling although cyclone separators or other known separating means may be employed. The separated solids may then pass by gravity through a cooler back to the adsorption zone.

In order to maintain the solids in fluidized form in standpipes, coolers, etc. it may be necessary or desirable to introduce an aerating gas at various points in the system. By employing a portion of the product gases from the system itself I can effect this aeration without contaminating the adsorbent material or the product with any extraneous gases. A relatively small compressor will serve to supply the necessary aeration gas for all parts of the system. No compressor is required, however, for supplying a conveyor gas because the conveyor gas is supplied from the adsorbent solids themselves in the heating or deadsorption zone.

The selectivity of the adsorption process can be materially increased by recycling a portion of the product gases or vapors to the adsorption zone at a point below the charged gas inlet or by supplying heat to the downwardly moving column of solids before said solids pass upwardly through the desorption or main heating step. By thus recycling product gases or vapors to a point below the charged gas inlet or supplying heat to the downwardly moving solids column below the gas charge inlet I obtain a countercurrent scrubbing or stripping of gas-laden adsorbent and thus remove substantial amounts of undesirable substances from the adsorbent in a manner analogous to stripping or reboiling in a liquid fractionation system.

The temperatures and pressures at which adsorption is effected will of course depend upon the materials undergoing separation. Operations in the general vicinity of atmospheric pressure are most desirable because the greater volumes of liberated gases at low pressure facilitate solids transfer to the high level separation zone. At higher pressures, e. g. of the order of 100 pounds per square inch or more, the desorption and transfer line must be at a correspondingly higher temperature in order to provide the necessary volume of gas or vapor for effecting catalyst transfer. Such considerations will, however, be apparent to those skilled in the art by the application of the well known gas laws.

The invention will be more clearly understood from the following detailed description of a specific example read in conjunction with the accompanying drawing which forms a part of the specification and which is a schematic flow diagram of my improved adsorption system.

The adsorption material in this particular example is a powdered silica gel having a particle size ranging from about .001 to .01 inch. In compact settled form the silica gel may have a bulk density of about 40 pounds per cubic foot. With amounts of aeration gas sufficient to fluidize the silica gel, i. e. to make it fluent or readily flowable, the bulk density may be of the order of 25 to 35 pounds per cubic foot. When a gas is passed upwardly through the silica gel at a velocity of about .5 to 2 feet per second the silica gel becomes suspended as a dense liquidlike phase the density of which may be of the order of about 10 to 20 pounds per cubic foot. When a settling space is provided above this dense phase the powdered solids can be settled out of the upper dilute or dispersed phase so that in the upper part of the dispersed phase the adsorption material concentration may be measured in grains per cubic foot rather than in pounds per cubic foot. Remarkably complete separation may be obtained between gases or vapors and solids in this light dispersed phase by the use of cyclone separators, filters, or other known separation means.

When the system illustrated in the drawings is employed to recover gasoline components from natural gases and designed to handle about 10,000 cubic feet per minute of gas charged, the adsorber tower 10 may be about 10 to 15 feet in diameter by about 30 to 50 feet or more in height. Adsorber material from the hopper section 11 of separator chamber 12 flows downwardly by gravity through the tubes of cooler 13 and is introduced at the upper part of adsorber tower 10 through conduit 14 in amounts controlled by valve 15. Cooling fluids may be introduced around the tubes in the cooler through line 16 and withdrawn therefrom through line 17. The downwardly flowing solids (including the solids in hopper 11 and separator 12) may be maintained in aerated condition by the introduction of aeration gas through line 18 and distributor 19.

When the powdered material has reached the desired level in the adsorption tower, e. g. 10 or 20 feet from the top of the tower, the gas charge is introduced through line 20 and distributor 21. The gas then passes upwardly countercurrent to the downwardly moving adsorption material which is withdrawn from the base of the adsorbent tower as a downwardly moving aerated column in conduit 22. The 10 to 20 foot disengaging space at the upper part of the tower provides for settling out most of the solids from the ascending gases but if desired or necessary a cyclone separation system 23 or other separating means may be employed to prevent losses of solids with gases which are vented from the adsorber tower through line 24.

The vertical velocity of gases in the tower 10 in this particular example may be about 1 foot per second so that the solids are in fluidized dense phase condition. Turbulence in such system is advantageous in many respects but excessive turbulence may detract from true countercurrent contacting. To prevent rapid movement of solids from top to bottom and vice versa in the adsorber tower I may employ a multiple stage baffling system as exemplified by U. S. Patent 2,270,903 or I may simply provide a series of perforated plates at spaced levels with relatively large, e. g. about ½ to 1 inch openings, closely and uniformly spaced across each entire plate so that solids may slide downwardly at the periphery of the openings while gases are flowing upwardly with maximum velocity at the centers of the openings. Similarly the tower may be divided into separate zones by trays or plates similar in structure to conventional bubble plates employed in petroleum distillation equipment. With lower gas velocities in tower 10 the adsorbent solid may pass downwardly as a relatively nonturbulent fluidized mass which resembles more closely a moving catalyst bed. It is important, however, that the catalyst mass be sufficiently aerated or fluidized so that it will exert a pseudo-hydrostatic head thereby supplying the pressure head necessary for catalyst transfer.

At the base of tower 10 and below gas inlet charge 20 I may introduce an aeration or stripping gas through line 25. Such gas is preferably a rich gas, i. e. one consisting essentially of desired product so that in addition to insuring the fluidity of solids in the base of the tower this gas may act as a stripping means to desorb undesirable components from the adsorbent material. Instead of introducing a gas through line 25 I may heat the downwardly moving column in conduit 22 by introducing a heating fluid into jacket 26, through line 26a, the heating fluid being removed through line 26b. A slight heating of the saturated adsorbent material will liberate enough gas or vapor to insure aeration and fluidization of solids and likewise to serve as a stripping medium.

Rich adsorber material is discharged from the base of conduit 22 in amounts regulated by valve 27. Aeration gas may be introduced through lines 28 and 29 to insure that the solids are fluidized both before and after valve 27. Make-up adsorption material may be introduced into the system through line 30 or directly into separator 12.

From the base of the downwardly moving column in conduit 22 the rich adsorbent material flows upwardly to heater 31 which serves as a desorption zone and likewise as a gas generator for effecting adsorbent transfer. The rapid liberation of adsorbed gases and vapors from the solids entering the tubes of heater 31 causes a sharp increase in gas volume. The tubes in which the adsorbent material is heated are of restricted cross-sectional area, e. g. only a few inches in diameter, so that the sharp increase in gas volume causes a great increase in upward gas velocity, which should be upwards of 10 feet per second and preferably much higher. The liberated gases and vapors thus suspend the solids in a rapidly flowing stream of relatively low density which stream carries the solids upwardly through substantially vertical conduit 32 to separation chamber 12, the solids being downwardly deflected by baffle 33. Heating fluid may be introduced around the tubes of heater 31 through line 34 and withdrawn through line 35. Similarly the vertical conduit 32 may itself serve as a desorption and gas generating zone, i e. it may be provided with a heat exchange jacket 36 into which heating fluid is introduced into line 37 and from which said fluid is withdrawn through line 38. The rapid heating of the rich adsorbent material in heater 31 liberates a sufficient volume of gas or vapor to carry the adsorbent upwardly through line 32. The continued heating of the adsorbent in its upward travel completes the desorption of gases and vapors therefrom so that by the time the solids reach separation chamber 12 it is substantially freed from adsorbed hydrocarbons.

The bulk of the solids settles by gravity in separator 12 but if desired a mechanical separation system diagrammatically illustrated by cyclone separator 39 may be employed to knock back any particles which might otherwise tend to be entrained or carried over with product vapors. The product vapors pass by line 40 and cooler 41 to separator-receiver 42. Product liquid may be withdrawn over weir 43 and withdrawn through line 44. Gases from the upper part of separator 42 may be compressed by small compressor 45, passed by line 46 for use as aeration gas in lines 18, 25, 28 and 29. Any solids carried over into separator 42 may be withdrawn as a slurry through line 47 and injected into the hot aerated solids in hopper 11 by means of slurry pump 48. Any uncondensed gases in excess of amounts required for aeration may be withdrawn through line 49 by opening valve 50 when the pressure in separator 42 materially exceeds the desired pressure in the upper part of separator 12.

In this particular example the pressure at the top of separator 12 may be about 5 pounds per square inch (gauge pressures referred to unless otherwise indicated). Due to the head or "pseudo hydrostatic" pressure of fluidized solids in separator 12 and hopper 11 (the solids being fluidized by aeration gas from line 18), the pressure at the base of hopper 11 may be about 7 pounds and above valve 15 the pressure may be about 9 pounds. The pressure at the top of adsorber tower 10 may be about 6 to 8 pounds and the pressure at the bottom of tower 10 about 10 to 14 pounds per square inch. An added pressure head or "pseudo hydrostatic" pressure of about 1 to 3 pounds may be obtained by virtue of the fluidized solids in conduit 22. Thus the pressure head on fluidized solids above valve 27 may be of the order of about 15 pounds per square inch, which pressure is sufficient to force the fluidized solids upwardly into heater 31.

The rapid liberation of gases in heater 31 and sharp increase in gas velocity effects suspension of the desorbed solids as a dilute phase in the gases flowing upwardly in line 32. The bulk density of solids in line 32 will be less than 5 pounds per cubic foot and may be of the order of 2 pounds per cubic foot or less so that even though line 32 may be upwards of 100 feet in height, the catalyst head in this column will be less than the catalyst head at the base of conduit 22. The kinetic energy imparted to the gaseous stream in the heating step and the differential head produced by virtue of the denser phase in the adsorber tower and conduit 22 and the more dilute phase in heater 31 and conduit 32 effect the elevation of the solids to the settler. If more differential head is required for effecting transfer, it may be obtained by lengthening lines 22 and 32. The gases liberated in heater 31 suspend the catalyst in so dilute a phase and exert such a gas lift as to effect transfer of the solids to the separation zone without the use of any mechanical impeller or conveyor and without the use of any extraneous carrier fluid. The avoidance of extraneous carrier fluids is extremely important because the addition of extraneous materials contaminates the product and thus requires additional separation steps and because added carrier gases, such as steam, may have a very adverse effect on the adsorptive property of the adsorbent material itself.

Instead of or in addition to cooling the solids entering adsorption tower 10 I may effect this cooling in the tower itself by the use of any known heat exchange system. The cooling of the solids in the adsorption tower is diagrammatically illustrated by cooling jacket 51 into which a cooling fluid may be introduced through line 52 and from which such fluid may be withdrawn through line 53. Alternatively the solids may be downwardly withdrawn as a dense phase fluidized column from separation zone 12, dispersed in a carrier gas (such as compressed gas from line 18) and passed upwardly through a cooler en route to adsorber tower 10.

Where the selectivity of the adsorption is of considerable importance it is highly advantageous to effect a "stripping" of the rich adsorbent material in the zone between the gas charge inlet and valve 27. Such stripping may be effected either by introducing vaporized product of desired composition through lines 25 and 28 or it may be effected by slightly heating the adsorbent material in conduit 22 in order to release the small amount of gas which thereafter serves as aeration or fluidizing gas and also as a stripping gas which tends to desorb undesirable components from the solids and to replace components thus desorbed. When my system is employed for separating butanes from butylenes and the adsorbent material selectively adsorbs butenes there will nevertheless be a certain amount of butanes carried by the solids below the point of gas charge inlet. By partial desorption of adsorbate from the adsorbent (slight heating) or by introducing a portion of recovered butenes leaving separator 12 or chamber 42, butane may be stripped from the adsorbent, passed upwardly through tower 10 and the material finally recovered from the adsorbent will thus be of higher purity (will contain less butane) than would otherwise be possible.

From the above description of a preferred embodiment of my invention it will be seen that I have accomplished my stated objects. The example is, however, by way of illustration and not by way of limitation since many alternative systems, procedures and operating conditions falling within the scope of my invention will be apparent from the above description to those skilled in the art. For example, the cooled solids from cooler 13 may be introduced into adsorption tower 10 along with the gas charge at the lower part of the tower instead of being introduced at the upper part of the tower. In this embodiment conduit 14 will be outside of the tower and will form a standpipe which may be provided with aeration means and with a valve at its base for regulating the amount of solids dispersed in the incoming gas charge. Such an operation will offer the advantage of lowering the elevation of separator 12 and thence shortening the length of conduit 32; it will not, however, offer the advantage of countercurrent adsorption which in most cases is sufficiently great to warrant the type of system illustrated in the drawing. The product recovery system may be very different from that illustrated in the drawing and any known method of product recovery may be employed without departing from the invention. Having explained the application of the invention to the separation of condensible hydrocarbons from relatively fixed hydrocarbon gases, the application of the invention to other adsorption processes will be clearly evident.

I claim:

1. In a process for cycling adsorbent solids of small particle size from an adsorption zone to a desorption zone and thence back to said adsorption zone, the method of operation which comprises enriching said adsorbed material in said adsorption zone, transferring said enriched solids to a desorption zone of restricted cross-sectional area, heating said solids in said desorption zone to a sufficiently high temperature to release adsorbed material and thereby produce a gasiform stream which, due solely to the restricted cross-sectional area, moves through said desorption zone and to an elevated separation zone at such high velocity as to supply the required kinetic energy for suspending and transferring denuded solids to said elevated separation zone, thereby converting at least a part of the kinetic energy imparted by the heating step to potential energy of elevated solids, and utilizing the potential energy of the elevated solids for effecting transfer of said solids from said separation zone back to said adsorption zone.

2. The method of claim 1 which includes the step of cooling said solids in the course of their transfer from said separation zone to said adsorption zone.

3. The method of separating components of a gasiform stream which method comprises countercurrently contacting said gasiform stream with a mass of finely divided solid adsorption material under conditions for effecting selective adsorption, removing the unadsorbed component from the upper part of said contacting zone, removing adsorption material containing the adsorbed component from the lower part of the contacting zone, introducing said removed adsorbent material into a heating zone of restricted cross-sectional area, supplying sufficient heat in said heating zone to effect desorption of adsorbed material and to produce a high velocity gaseous stream, conveying said adsorbent material from said heating zone to an elevated separation zone solely by the kinetic energy of said gaseous stream imparted by said heating step, separating adsorbent material from said gaseous stream in said separation zone, cooling said separated adsorbent material and returning said cooled adsorbent material to said countercurrent contacting zone.

4. The method of continuously cycling adsorbent solids of small particle size from an adsorption zone to a desorption zone and back to said adsorption zone, which method comprises adsorbing a gasiform material in said solids to form rich solids in the adsorption zone, passing said rich solids in dense-phase fluidized condition by pressure head into a desorption zone of restricted cross-sectional area, heating said rich solids in said desorption zone to a temperature sufficient to rapidly liberate a large amount of gasiform material and to form denuded solids, suspending said denuded solids in liberated gasiform material to form a rapidly flowing stream of low density, conveying denuded solids from said desorption zone through a passageway of small cross-sectional area to an elevated separation zone of large cross-sectional area solely by the carrying action of said rapidly flowing stream of low density, separating gasiform material from solids in said separation zone, and passing solids downwardly by gravity from said separation zone to said adsorption zone.

5. The method of claim 4 which includes the step of cooling solids during their passage by gravity from said separation zone to said adsorption zone.

6. The method of claim 4 which includes the step of heating said rapidly flowing stream of low density between said desorption zone and said separation zone.

7. The method of claim 4 which includes the step of stripping material from rich solids during the passage thereof to said desorption zone.

8. The method of claim 4 which includes the step of introducing an aeration gas into the dense phase of rich solids during its passage to the desorption zone.

9. In a process for separating components of a gasiform stream wherein said gasiform stream is contacted with adsorbent solids of small particle size under adsorption conditions in an adsorption zone, unadsorbed gasiform material is withdrawn from the adsorption zone, rich adsorbent solids are introduced from the adsorption zone to a desorption zone of restricted cross-sectional area and therein heated to remove adsorbed material from denuded solids and wherein the denuded solids are then cooled and returned to the adsorption zone, the method of operation which comprises maintaining the solids in fluidized condition throughout the process, maintaining a height and density of the fluidized solids entering the desorption zone to provide sufficient pressure head for introducing rich solids into the desorption zone, supplying sufficient heat in the desorption zone to rapidly liberate gasiform material from at least partially denuded solids whereby the volume of the fluidizing gas is sharply increased and a high velocity stream of low density is produced in said restricted cross-sectional area, conveying solids solely by the carrying action of said stream through an upwardly extending passageway of small cross-sectional area to a separation zone of large cross-sectional area, removing gasiform material from said separation zone and returning separated solids from said separation zone downwardly by gravity to said adsorption zone.

PRESTON L. BRANDT.

REFERENCES CITED

The following references are of record in the file of this patent:

UNITED STATES PATENTS

| Number | Name | Date |
| --- | --- | --- |
| 1,422,007 | Soddy | July 4, 1922 |
| 1,577,534 | Miller | Mar. 23, 1926 |
| 1,784,536 | Pantenburg | Dec. 9, 1930 |
| 2,127,993 | Crawford | Aug. 23, 1938 |
| 2,180,386 | Balcar | Nov. 21, 1939 |
| 2,256,940 | Crawford | Sept. 23, 1941 |
| 2,270,903 | Rudbach | Jan. 27, 1942 |
| 2,302,209 | Goddin | Nov. 17, 1942 |
| 2,311,564 | Munday | Feb. 16, 1943 |